United States Patent [19]

Shimizu

[11] Patent Number: 4,460,245
[45] Date of Patent: Jul. 17, 1984

[54] LENS MOUNTING

[75] Inventor: Seiichi Shimizu, Kanagawa, Japan

[73] Assignee: Canon Kabushiki Kaisha, Tokyo, Japan

[21] Appl. No.: 329,937

[22] Filed: Dec. 11, 1981

[30] Foreign Application Priority Data

Dec. 18, 1980 [JP] Japan .................................. 55-180197

[51] Int. Cl.³ .............................................. G02B 7/02
[52] U.S. Cl. ..................................... 350/253; 350/255
[58] Field of Search ................ 350/253, 255, 429–430; 354/195, 198

[56] References Cited

U.S. PATENT DOCUMENTS

| 3,095,794 | 7/1963 | Raab ..................................... 350/255 |
| 3,841,735 | 10/1974 | Katagiri et al. ..................... 350/255 |
| 4,166,675 | 9/1979 | Kanno ................................. 350/255 |

FOREIGN PATENT DOCUMENTS

| 2555953 | 6/1977 | Fed. Rep. of Germany ...... 350/429 |
| 12606 | 2/1981 | Japan ................................. 350/255 |

Primary Examiner—William H. Punter
Attorney, Agent, or Firm—Toren, McGeady and Stanger

[57] ABSTRACT

A lens mounting having a focusing actuator movable on a fixed barrel to effect focusing, wherein as the ambient temperature changes, the shift of the terminal position of the aforesaid focusing actuator is compensated for.

8 Claims, 10 Drawing Figures

LENS MOUNTING

BACKGROUND OF THE INVENTION

1. Field of the Invention

This invention relates to photographic objective mountings, and more particularly to a device for adjusting the position of a terminal end of movement of the focusing actuator ring.

2. Description of the Prior Art

Photographic instruments having camera lenses are susceptible in various ways to environmental changes and particularly ambient temperature change. In the art of photo taking lenses, various special optical glasses have been developed in recent years to attempt improvements of the imaging performance.

Particularly with regard to telephoto objectives, for correction of chromatic aberrations, use is made of fluorite and other special optical glasses to facilitate an improvement of the image quality. In special optical glass, however, the coefficient of linear expansion is large as compared with ordinary glass so that a change in the curvature and refractive index of the lens due to the temperature change is quite perceptible. Also, since the telephoto objective has a long physical length, its mounting of metal contributes to its sensitivity to the temperature change. Thus, there access a problem in that the plane of sharp focus is caused to shift. In more detail, the interchangeable objective of relatively long focal length is focused on an infinitely distant object by positioning the focusing ring at one terminal end of movement. Taking this terminal position as the start point, the distance scale is calibrated. Therefore, when the temperature changes, the focusing ring, fixed barrel, lens holder and helicoid-threaded portions thereof, all of which contribute to the focusing adjustment, are caused to change their dimensions mainly by their having different expansion coefficients with the result that the focus setting for infinity by the focusing ring in the stopped position becomes erroneous. To compensate for this, the stopped position must be re-adjusted when it has deviated from that for the standard temperature.

Attempts have been made to eliminate the above-described drawback by arranging the focusing ring to be movable beyond the position for the infinitely distant object. However, even when photographing at standard temperature, which is when the lens is most frequently used, the photographer is required to repeat the focusing re-adjustment each time, though the object distance is the same. Thus, such a lens is very troublesome in handling and does not permit speedy focusing, and, also causes photographic opportunities to be missed.

A prior art device for adjusting the stopped position of the focusing actuator by taking into account the change in the working temperature is known from Japanese Utility Model Publication Sho No. 52-55059 and is illustrated in FIGS. 1 and 2 wherein 1 is a fixed barrel having an adapter 1a at the rear end thereof to attach with a camera body; 2 is an intermediate sleeve connected to a distance setting member 3 with a portion of the outer periphery thereof being threadedly fitted in the front inner diameter of the aforesaid fixed barrel 1; and 4 is an inner sleeve holding a lens system (not shown) with a portion of the outer periphery thereof being threadedly fitted in the inner diameter of the intermediate sleeve 2. The fixed barrel 1 is provided with a key groove 5 extending in the axial direction in the inner surface thereof, and the inner sleeve 4 is provided with a key 6 engaging in the key groove 5, said key groove 5, key 6 and the threading relationship of the intermediate sleeve 2 with both of the inner periphery of the fixed barrel 1 and the outer periphery of the inner sleeve 4 forming a so-called double helicoid mechanism.

Rotatably fitted on the outer diameter of the fixed barrel is a stopper member 7 having a radial hole 8 into which a shaft portion 10a of a lock member 10 for locking the stopper member 7 penetrates and after having passed through an elongated slot 9 provided in the fixed barrel 1, threadedly engages in a tightening member 11 positioned on the inner periphery of the fixed barrel 1. 12 is a set ring of the lock member 10. The lock member 10 is allowed to move circumferentially relative to the fixed barrel 1 in a certain range defined by the elongated slot 9. Since it is within the same range that the stopper member 7 also is rotatable in cooperation with the lock member 10, its position can be adjusted. The tightening member 11 also cooperates with the lock member 10. When the lock member 10 is tightened, a shoulder portion 10c formed in the root of a control knob 10b which projects outwardly of the outer periphery of the stopper member 7 and the tightening member 11 presses across the fixed barrel 1 and stopper member 7, whereby the stopper member 7 is rigidly secured to the fixed barrel 1 which in turn also causes the lock member 10 to hold itself stationary.

The stopper member 7 has a cutout 7a of a certain angular length formed in a portion of the front edge thereof, into which is projected a lobe 3a formed on the inner periphery of the distance adjusting ring 3 at a point in the area which overlaps the stopper member 7. The cutout 7a has one side edge 7a1 which upon contact with the lobe 3a defines a focusing position for the infinitely distant object, and another side edge (not shown) to define a closest focusing position, thus inhibiting the distance adjusting ring 3 from being turned beyond the focus scale.

The distance scale which is indicated at 12 is given on the ring 3 and an index 13 cooperating therewith on the stopper member 7 along with a depth scale 14, which enables the photographer to read a focus setting and the depth of field at that setting.

Now assuming that the given lens is used, for example, at a low temperature with a shift of the sharp image plane toward the front, then, as has been mentioned above, the lens system must be moved nearer to the film plane than when at ordinary temperature. Therefore, at this time, the lock member 10 is loosened to release the stopper member 7 from the rigid connection to the fixed barrel 1. After that, the photographer can focus the lens on the infinitely distant object by turning the distance adjusting ring 3. Then, with the distance adjusting ring 3 in the thus-readjusted position, the stopper member 7 is turned to place its side edge 7a1 in contact with the lobe 3a and then tightened by the lock member 10 in a manner described above.

In the case of such a conventional device, however, the position adjusting procedure of the stopper member 7 after the loosening of the lock member 10 is to seek a matching position of the stopper member as determined by the actual temperature by turning it back and forth over the range defined by the slot 9 provided in the fixed barrel. Such a procedure is a very uncertain operation, and is further followed by the retightening of the lock member 10.

SUMMARY OF THE INVENTION

It is an object of the present invention to provide a device which makes it possible to compensate for the shift of the stopped position of the focusing actuator due to temperature change by a simple operation.

Another object of the present invention is to provide a device having a plurality of stopper members which are arranged to selectively cooperate with the focusing actuator depending upon the temperature region in which the lens mounting is used, wherein a simple operation of a control member accessible from the outside of the lens mounting suffices to effect changeover of the stopper members.

To accomplish the above-described objects of the invention, taking into consideration situations where the lens is to be used in one working temperature region after it has been returned from another working temperature region, it is a concomitant object of the present invention to provide a device which makes it possible for the photographer to effect the compensation of the shift of the stopped position of the aforesaid focusing actuator due to the change from one temperature region to another in a one-touch fashion.

Still another object of the present invention is to provide a device which makes it possible to readjust the relative position of the distance scale to the index therefor of the focusing actuator in automatic response to the working temperature region of the lens mounting by using a temperature-sensitive component.

DESCRIPTION OF THE PREFERRED EMBODIMENTS

Figure 1:
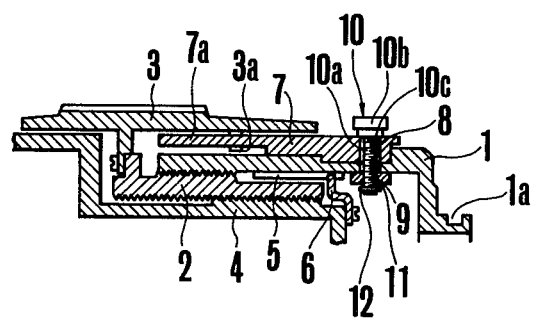
FIGS. 1 and 2 are, respectively, a sectional view and a side view illustrating the prior art.
Figure 2:
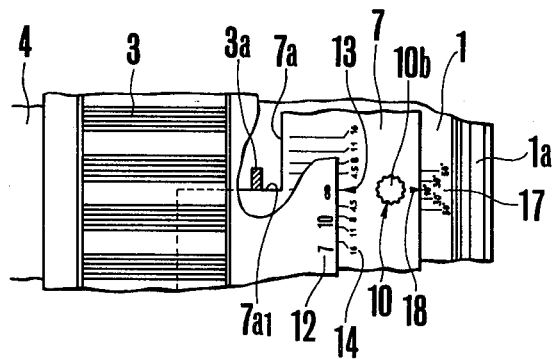
Figure 3:
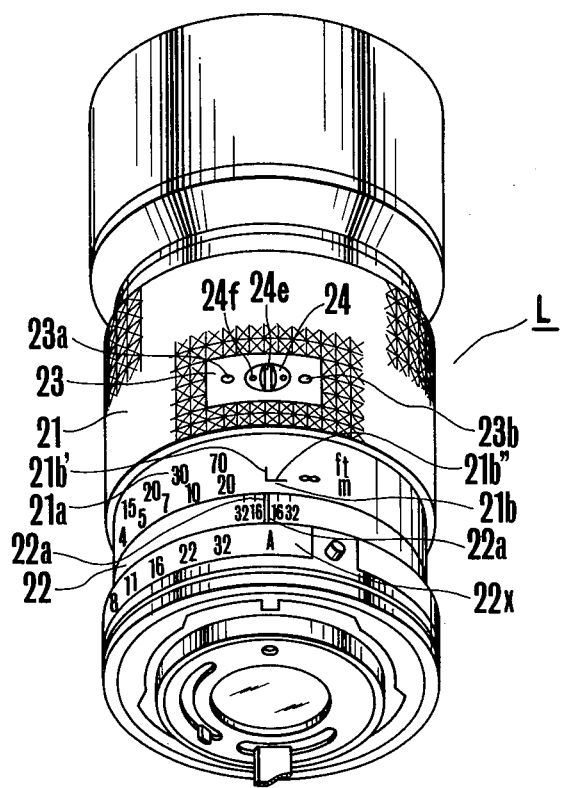
FIG. 3 is a perspective view of a first embodiment of the invention as applied to an interchangeable lens mounting.

The present invention will next be described in connection with embodiments thereof by reference to the drawings.

FIGS. 3 to 6 illustrate a first embodiment. In the drawings, reference character L denotes an objective lens, providing an example of application of the present invention as to an interchangeable lens. 21 is a focusing ring for the lens L. Rotative movement of the focusing ring 21 about the lens axis controls axial movement of the focusing lens member (not shown). 21a is a distance scale displayed on the focusing ring 21. 21b is a mark indicating a range of compensation of the temperature at 21b" along with a point of position for an infinitely distant object at the ordinary temperature at 21b'. 21c is a spot facing portion associated with a penetration hole 21d, the portion 21c accommodating a changeover means to be more fully described later.

22 indicates a fixed barrel of the objective lens L having an index 22a for the distance scale and a depth scale 22b. 22x is a diaphragm presetting ring.

24 is a changeover member for changing the stopped position of the focusing ring, having a shaft portion 24a fitted in the hole 21d, a flange 24b seated in the spot facing portion 21c, a projected portion 24c outwardly of said flange 24b (radially outwardly of the lens), a slot 24e in the head of the projected portion and a changing-over index 24f.

A retainer member 25 for the changeover member 24 takes its place after the changeover member 24 has been inserted into and seated in the spot facing portion 21c and hole 21d of the focusing ring 21, while the head 24c is exposed out of a hole 25b, whereby the flange 24c though suppressed under a spot facing portion 25a allows for rotative movement of the changeover means 24.

26 denotes screw fasteners for the aforesaid retainer member 25.

An index plate 23 is provided for adjusting the shift of the stopped position of the focusing ring for the infinitely distant object as the temperature changes, and it is fixedly secured to the focusing ring by the screw fasteners 26 passing through fitted holes 23a and 23b. The index plate 23 is provided with a hole 23c to permit access of the tip of a screw driver or like tool to the slot 24e in the head 24c of the changeover member 24.

Figure 4:
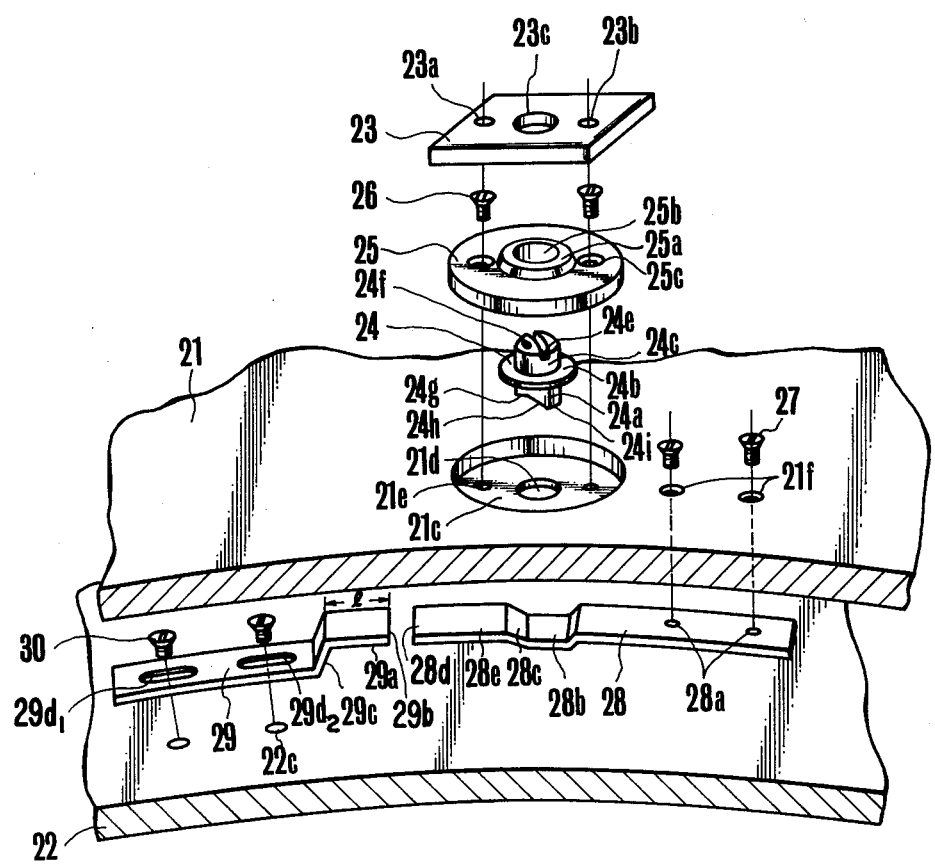
FIG. 4 is an exploded perspective view of an adjusting device arranged between the focusing ring 21 and fixed barrel 22 of the lens mounting of FIG. 3.
Figure 5A:
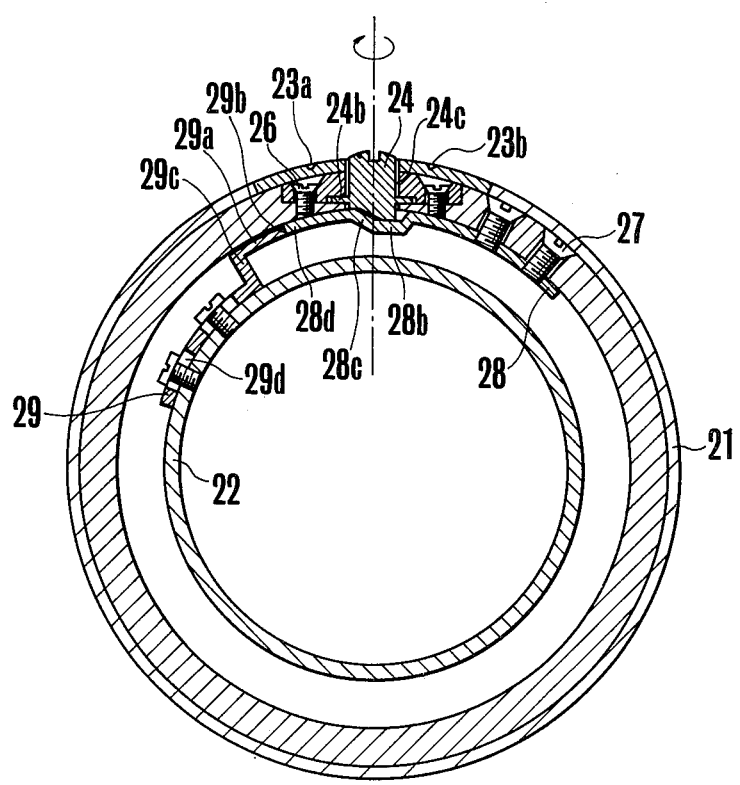
FIGS. 5(a) and 5(b) are sectional views of the adjusting device of FIG. 4 in two different operative positions for the normal and abnormal temperatures respectively.
Figure 5B:
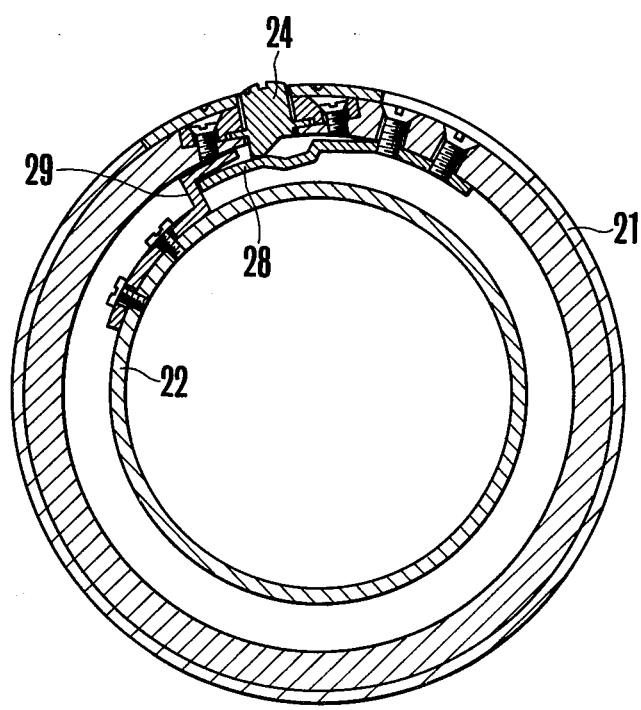
Figure 6:
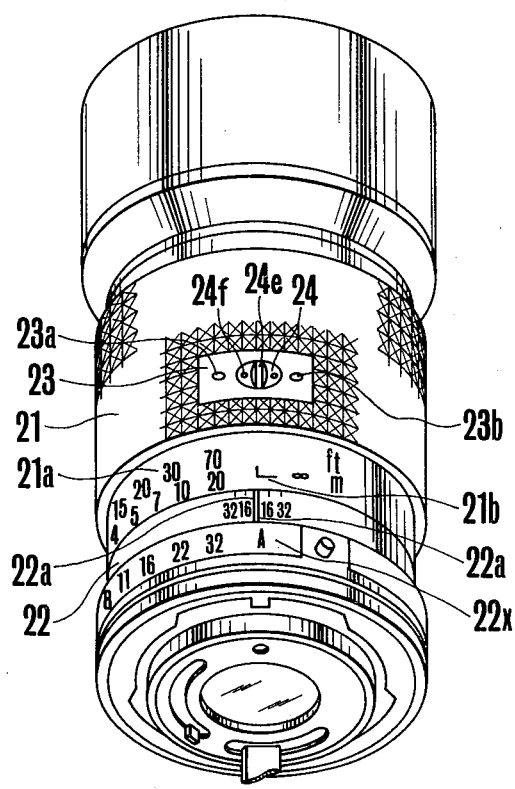
FIG. 6 is a perspective view of the lens mounting after the compensation is effected.

As illustrated in the exploded perspective view of FIG. 4 and the sectional views of FIGS. 5(a) and 5(b), arranged between the focusing ring 21 and the fixed barrel 22 are adjusting members 28 and 29 for stopping rotation of the focusing ring 21. The first adjusting member 29 is fixedly secured to the outer periphery of the fixed barrel 22 by screw fasteners 30 and has a ramp portion 29c followed by one end 29a of which the edge 29b lies in a concentric path to the free end 28d of the second adjusting member 28. The first adjusting member 29 has longitudinally elongated slots 29d1 and 29d2 into which the screw fasteners 30 penetrate for the purpose of fine adjustment in position of the member 29. The second adjusting member 28 is fixedly secured to the inner periphery of the focusing ring 21 by screw fasteners 27 at one end thereof, the opposite end of which constitutes a free end having a recessed portion 28b.

The recessed portion 28b is radially aligned with the changeover member 24, and is conformed with the end of the shaft portion 24a so that, since, as illustrated in FIGS. 4 and 5(a), that end has two stages 24g and 24i with a taper surface 24h therebetween, the first stage 24g engages with a portion 28e of said second adjusting member 28, the taper surface 24h with a slant surface 28c and the second stage 24i with the bottom of the recessed portion 28b.

In operating the device of such construction, when the objective lens L is to be used at the ordinary ambient temperature, the photographer will operate the changeover member 24 to place its mark 24f in registry with the index for the normal focusing position on the plate 23, whereby the end 29b of the first adjusting member 29 is positioned in edge-to-edge relation with the second adjusting member 28 as illustrated in FIG. 5(a) when the focusing ring 21 is turned to the terminal end where the objective lens is accurately focused on the infinitely distant object.

As the ambient temperature increases to exceed a predetermined level, the infinite focus setting must be readjusted, or otherwise an error would be introduced into the relationship between the stopped position of the focusing ring 21 and the real focusing of the objective lens at infinity. To cancel out this error, the photographer needs only to turn the changeover member 24 by an angular distance of 180°. In this case, the second adjusting member 28 is caused to deflect its free end away from the concentricity with the end 29a of the first adjusting member 29, so that the focusing ring 21 is rendered rotatable beyond the distance scale by a length l. Upon further full rotation of the focusing ring 21, the position of FIG. 5(b) is taken where the shift of the sharp image plane resulting from the temperature change is just compensated for.

Figure 7A:
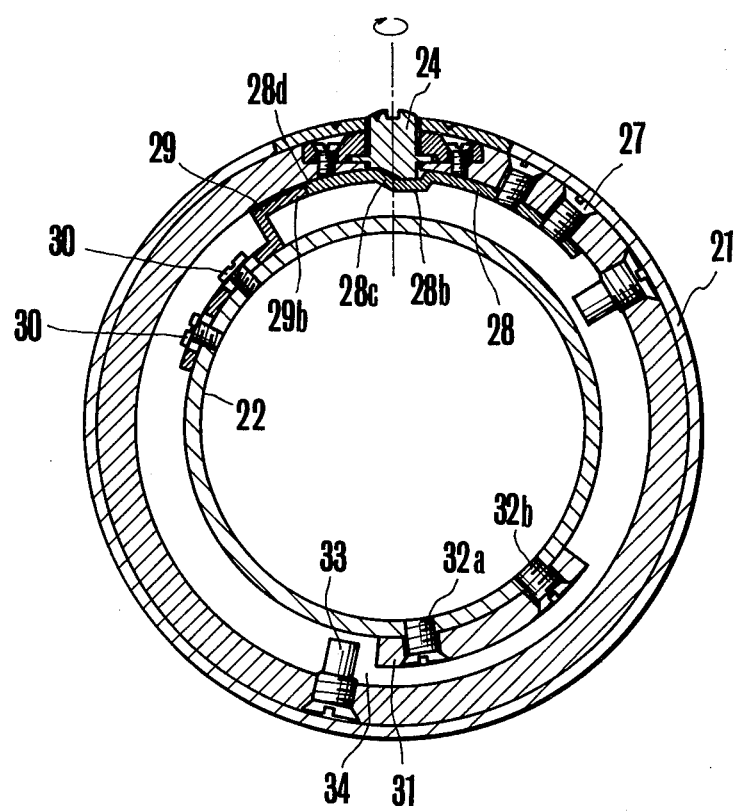
FIGS. 7(a) and 7(b) are sectional views of a second embodiment of the lens mounting according to the present invention.
Figure 7B:
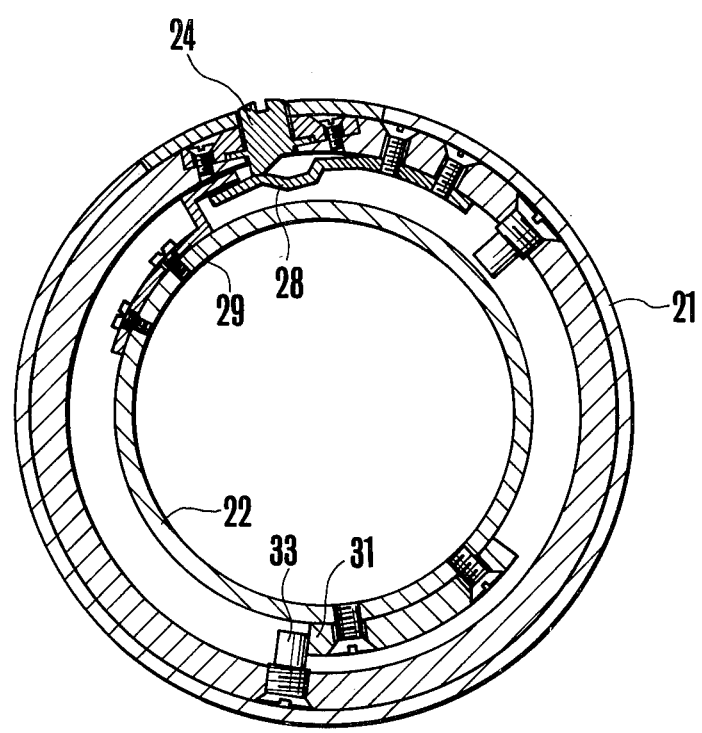

FIGS. 7(a) and 7(b) illustrate a second embodiment of the present invention which is characterized in that use is made of two stopper members as arranged to selectively cooperate with the focusing ring depending upon the working temperature region. In the drawings, the same reference characters have been employed to denote similar parts to those illustrated in connection with the first embodiment.

In the drawings, the fixed barrel 22, focusing ring 21, first adjusting member 28, first stopper member 29, and changeover member 24 are similar in arrangement and form to those of the above-described embodiment. There are further provided a second stopper member 31 fixedly secured to the fixed barrel 1 by screw fasteners 32a and 32b and an engaging member 33 fixedly secured to the focusing ring 21.

This embodiment operates in such a manner that, for example, when in use at the ordinary temperature, one terminal end of movement of the focusing ring which corresponds to a focusing position for the infinitely distant or closest object is defined by the first stopper member 29 in engagement at the end 29b with the end 28d of the adjusting member 28. At this time, the engaging member 33 does not abut on the stopper member 31 as there is a gap 34 therebetween.

Next when the working ambient temperature is elevated, the various parts of the lens mounting expand with the result that the relative position of the focusing ring 21 to the fixed barrel 22 for the infinitely distant object or the closest object changes. Therefore, a necessity arises that such change must be compensated for.

Then, the changeover member 24 is turned as illustrated in FIG. 5(a) to thereby push down the free end of the adjusting member 28 inwards under the action of the cam or tapered portion 24g, 24h and 24i (see FIG. 7(b). Then, the focusing ring 21 is further turned without the interference between the first adjusting member 28 and the first stopper member 29 until the engaging member 33 abuts on the second stopper member 31 (FIG. 7(b)). Therefore, if the position of the second stopper member 31 is preadjusted to account for the expansion of the parts due to the temperature change, the readjustment of the stopped position of the focusing ring 21 can be formed.

Figure 8:
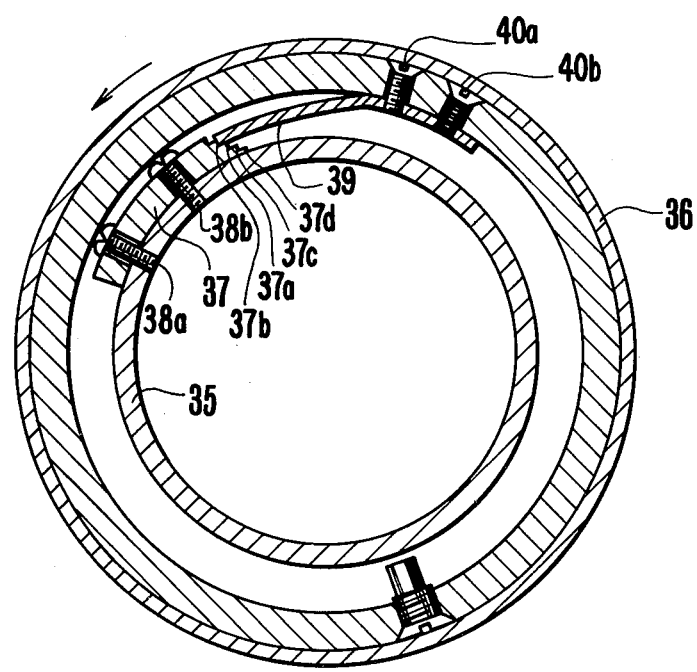
FIG. 8 is a sectional view of a third embodiment of the lens mounting according to the present invention.

FIG. 8 illustrates a third embodiment of the present invention in which the stopped position of the focusing ring is automatically readjusted in accordance with variation of the temperature.

In the drawing, 35 is a fixed barrel of the lens mounting; 36 is a focusing actuator arranged on the outer periphery of the fixed barrel 35 to turn about the lens axis so that the focusing member (not shown) is axially moved.

37 is a stopper member fixedly secured to the fixed barrel 35 by screw fasteners 38a and 38b and having a number of stages 37a, 37b, ... 37d formed in one end portion thereof to determine the stopped position of the focusing actuator in discrete points selectively.

39 is an engaging member fixedly secured to the inner periphery of the focusing actuator 36 by screw fasteners 40a and 40b. The free end of the engaging member 39 is arranged so as to confront the stepped portion 37a, ... of the stopper member 37.

The engaging member is made of a material, for example, bimetal, having the property of producing displacement, deformation, or deflection as the ambient temperature changes.

In operating the device of FIG. 8, when in use, for example, at the ordinary temperature, the focusing actuator 36 is stopped by the stopper member 37 with its stage, in this instance, 37b engaging the free end of the engaging member 39 so that an accurate focus setting of the objective lens for the infinitely distant or closest object is automatically formed, since the stepped portion 37b of the stopper member 37 is so dimensioned. As the ambient temperature increases, the engaging member 39 changes its position to such a point as to engage with the stage 37d of the stopper member 37. The resultant focus setting of the focusing actuator 36 is reflected to the accurate focusing of the objective lens at that elevated temperature.

Thus, it is made possible to readjust the stopped position of the focusing actuator in automatic response to variation of the temperature, provided that the stepped portions 37a, 37b, ... are machined according to increasing amounts of displacement of the engaging member 39 with increase in the temperature.

It is to be understood that the embodiment of FIG. 8 may be modified by exchanging the positions between the stopper member 37 and the engaging member 39.

As has been described above, the present invention is intended to provide a lens mounting with a device making it possible to adjust the stopped position of the focusing ring in accordance with variation of the temperature from the outside of the lens mounting, wherein the adjusting is exceedingly easy to achieve with high accuracy and reliability, thus providing a great advantage in that the device can be handled without causing deterioration of the high grade imagery of the lens.

Also even when in use, the provision of the temperature scale plate 23 having graduations 23a and 23b cooperative with the index 24f of the changeover member 24 enables the photographer to carry out easy and quick temperature settings.

It is noted that though the first embodiment has been described in connection with the first and second adjusting members having only two operative positions, a modification may be made in that the ramp portion 29c of the first adjusting member 29 is configured to a multistep shape, and the second adjusting member 28 is made movable stepwise. If so, the temperature setting can be made with a finer adjustment.

The embodiments of the invention has been described as applied to the interchangeable lens mounting; but the invention is not confined thereto. It is, of course, possible to apply the present invention to other than the interchangeable lens mounting, or those built into the cameras.

What is claimed is:

1. In a lens mounting provided with a fixed barrel having an index on the outer periphery thereof and a focusing actuator rotatably arranged on the outer periphery of said fixed barrel and having a distance scale arranged in cooperative relationship with said index, the improvement of means for adjusting the stopped position of said focusing actuator in accordance with the ambient temperature at which said lens mounting is used, comprising:
   (a) a stopping member for stopping rotation of said actuator, said stopping member having a plurality of stopping portions to change the amount of rotation of said actuator in response to the ambient temperature;
   (b) an engaging member fixedly secured to said actuator and arranged to engage one of the plurality of stopping portions of said stopping member; and
   (c) a selecting member operative upon engagement with said engaging member to select a stopping position between said engaging member and said stopping member, said selecting member being responsive to actuation from the outside for selecting one of the plurality of stopping portions of said stopping member.

2. A lens mounting according to claim 1, wherein:
   (a) said engaging member is arranged so as to be displaced to change the engaging position with said stopping member at the stopping portions thereof when said selecting member is operated from the outside.

3. A lens mounting according to claim 2, wherein:
   (a) that portion of said selecting member which engages with said engaging member is formed to a cam-like shape, and wherein said selecting member has a scale or an index for indicating the selected position of said selecting member.

4. In a lens mounting having a fixed barrel provided with an index on the outer periphery thereof and a focusing actuator rotatably arranged on the outer periphery of said fixed barrel and having a distance scale arranged in cooperative relationship with said index, the improvement of means for adjusting the stopped position of said focusing actuator in accordance with the ambient temperature at which said lens mounting is used comprising:
   (a) a plurality of stopping members fixedly secured to said fixed barrel; and
   (b) a plurality of engaging means fixedly secured to said focusing actuator and arranged to be engageable with said stopping members,
   wherein a first means of said engaging means when at a first working temperature region engages with one of said stopping members, and a second means when at a second working temperature region engages with another of said stopping members while said first engaging means avoids engagement.

5. A lens mounting according to claim 4, wherein:
   (a) the avoidance of said first engaging means in said second temperature region is effected by displacing the path of rotation of said first engaging means which rotates in unison with said focusing actuator.

6. A lens mounting according to claim 5, further comprising:
   (a) a control member for displacing said first engaging means, wherein when said control member is operated from the outside, said displacement is effected.

7. In a lens mounting having a fixed barrel provided with an index on the outer periphery thereof and a focusing actuator rotatably arranged on the outer periphery of said fixed barrel and having a distance scale arranged in cooperative relationship with said index, the improvement of means for adjusting the stopped position of said focusing actuator in automatic response to the ambient temperature at which said lens mounting is in use comprising:
   (a) a stopping member fixedly secured to said fixed barrel, said stopping member having a plurality of stopping positions for stopping said focusing actuator at a matching position depending upon the working temperature region; and
   (b) an engaging member fixedly secured to said focusing actuator, said engaging member being made of a material having the property of being deformed or deflected by the temperature, wherein as the working temperature region varies, the degree of deformation or deflection of said engaging member varies so that the position at which said engaging member engages with said stopping member varies.

8. In a lens mounting having a fixed barrel provided with an index on the outer periphery thereof and a focusing actuator rotatably arranged on the outer periphery of said fixed barrel and having a distance scale arranged in cooperative relationship with said index, the improvement of means for adjusting the stopped position of said focusing actuator in automatic response to the ambient temperature at which said lens mounting is in use comprising:
   (a) a stopping member provided on said focusing actuator, said stopping member having a plurality of stopping positions for stopping said focusing actuator at a matching position depending upon the working temperature region; and
   (b) an engaging member fixedly secured to said fixed barrel,
   said engaging member being made of a material having the property of being deformed or deflected by the temperature, wherein as the working temperature region varies, the degree of deformation or deflection of said engaging member varies so that the position at which said engaging member engages with said stopping member varies.

* * * * *